United States Patent
Sugino et al.

(10) Patent No.: US 7,704,572 B2
(45) Date of Patent: Apr. 27, 2010

(54) ADHESIVE FOR POLARIZING PLATE, POLARIZING PLATE, METHOD FOR PRODUCING SAME, OPTICAL FILM AND IMAGE DISPLAY

(75) Inventors: Youichirou Sugino, Ibaraki (JP); Ken Aoki, Ibaraki (JP); Tadayuki Kameyama, Ibaraki (JP); Hiroaki Mizushima, Ibaraki (JP); Morimasa Wada, Ibaraki (JP); Kenji Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1112 days.

(21) Appl. No.: 10/542,930

(22) PCT Filed: May 21, 2004

(86) PCT No.: PCT/JP2004/006929

§ 371 (c)(1), (2), (4) Date: Jul. 21, 2005

(87) PCT Pub. No.: WO2004/104655

PCT Pub. Date: Dec. 2, 2004

(65) Prior Publication Data

US 2006/0033993 A1 Feb. 16, 2006

(30) Foreign Application Priority Data

May 26, 2003 (JP) .............................. 2003-147358

(51) Int. Cl.
*B32B 7/10* (2006.01)
*G02F 1/1335* (2006.01)

(52) U.S. Cl. .............. 428/1.54; 428/1.31; 428/355 EN; 349/96; 349/122

(58) Field of Classification Search ................ 428/1.31, 428/1.33, 1.5, 1.54, 355 EN; 349/122, 96
See application file for complete search history.

(56) References Cited

U.S. PATENT DOCUMENTS

| 3,361,585 | A | * | 1/1968 | Armour et al. | ............ | 106/207.5 |
| 4,561,725 | A | * | 12/1985 | Hotta | .......................... | 349/132 |
| 4,824,696 | A | * | 4/1989 | Tokumo et al. | ........... | 427/208.6 |
| 6,404,469 | B1 | * | 6/2002 | Kitagawa et al. | ................ | 349/96 |
| 7,136,225 | B2 | * | 11/2006 | Matsumoto et al. | ......... | 359/491 |
| 7,149,031 | B2 | * | 12/2006 | Sakamaki | .................... | 359/582 |
| 2002/0075428 | A1 | * | 6/2002 | Saiki et al. | ..................... | 349/96 |

FOREIGN PATENT DOCUMENTS

| JP | 3064703 A | 3/1991 |
| JP | 7-134212 | 5/1995 |
| JP | 7-198945 | 8/1995 |
| JP | 9124874 A | 5/1997 |
| JP | 9258023 A | 10/1997 |
| JP | 11256130 A | 9/1999 |
| JP | 2002174728 A | 6/2002 |

OTHER PUBLICATIONS

JPO Website Machine English Translation of JP 07-134212, Matsumoto Koji et al., May 23, 1995.*
JPO Website Machine English Translation of JP 07-198945, Kitamura Shuichi, Aug. 1, 1995.*
JPO Website Machine English Translation of JP 07-268300, Asai et al., Oct. 17, 1995.*
International Preliminary Report on Patentability of corresponding International application No. PCT/JP2004/006929 mailed Mar. 23, 2006.

* cited by examiner

*Primary Examiner*—Sophie Hon
(74) *Attorney, Agent, or Firm*—Westerman, Hattori, Daniels & Adrian, LLP

(57) ABSTRACT

An adhesive for polarizing plate used in order to provide a transparent protective film on at least one surface of a polarizer, comprising a crosslinking agent in the range of more than 30 parts by weight and 46 parts by weight or less relative to 100 parts by weight of a polyvinyl alcohol-based resin having an acetoacetyl group, is excellent in water resistance.

18 Claims, No Drawings

ADHESIVE FOR POLARIZING PLATE, POLARIZING PLATE, METHOD FOR PRODUCING SAME, OPTICAL FILM AND IMAGE DISPLAY

This application is a 371 of PCT/JP04/06929 filed May 21, 2004.

TECHNICAL FIELD

This invention relates to an adhesive for polarizing plate. The invention further relates to a polarizing plate using the adhesive for polarizing plate and a fabrication method therefor. The polarizing plate alone or an optical film obtained by laminating the polarizing plate can constitute an image display such as a liquid crystal display, an organic. EL display or PDP.

BACKGROUND ART

In a liquid crystal display, for example, it is indispensable to dispose polarizers on both sides of a glass substrate providing a surface of a liquid crystal panel according to an image formation scheme adopted in the display. A polarizer is generally obtained in a procedure in which a polyvinyl alcohol-based film is dyed with a dichroic material such as iodine, thereafter, the film is crosslinked with a crosslinking agent and then, mono-axially stretched to thereby form a film. Since the polarizer is fabricated by stretching, it is easy to shrink. Since a polyvinyl alcohol-based film comprises a hydrophilic polymer, the film is very easily deformed especially in a humidified condition. Since the film itself is weak in mechanical strength, there has been a problem that the film is torn. Hence, adopted is a reinforced polarizing plate fabricated in a procedure in which a transparent protective film or transparent protective films each made from triacetyl cellulose or the like are adhered to on one side or both sides of a polarizer. The polarizing plate is fabricated by adhere the transparent protective film onto a polarizer using an adhesive.

A liquid crystal display in recent years has broadened applications, which covers a wide range from a portable terminal to a home large-sized TV, and sets of specifications have been provided for various kinds of applications. Especially, in the application of a portable terminal, a user as a precondition carries on while moving; therefore, the portable terminal has very severe requirements for durability. Therefore, a polarizing plate is required a durability that any of characteristics, and a shape does not change even in a humidified condition where dew drops are formed.

A polarizer is, as described above, used as a polarizing plate obtained by being reinforced with the transparent protective film. As adhesives for the polarizing plate conventionally used in adhesion of the transparent protective film to the polarizer, preferable is an aqueous adhesive, for example a polyvinyl alcohol-based adhesive prepared by mixing a crosslinking agent into a polyvinyl alcohol aqueous solution. A polyvinyl alcohol-based resin adhesive has had a case where the transparent protective film is peeled at the interface between the polarizer and the transparent protective film in a humidified condition. This is considered because the polyvinyl alcohol-based resin, which is a main component of the adhesive, is a water-soluble polymer and therefore, there occurs a possibility that the adhesive dissolves thereof in an environment of dewing.

In light of the problems, proposal has been made of an adhesive for polarizing plate comprising a polyvinyl alcohol-based resin having an acetoacetyl group and a crosslinking agent (for example, Patent Document 1). Even the adhesive for polarizer described in patent document 1, however, is insufficient in water resistance.

Patent Document 1: JP-A No. 7-198945.

DISCLOSURE OF INVENTION

It is an object of the invention to provide an adhesive for polarizing plate excellent in water resistance. It is another object of the invention to provide a polarizing plate using the adhesive for polarizing plate and a fabrication method therefor. It is still another object of the invention to provide an optical film as a laminate of the polarizing plate and it is a further object of the invention to provide an image display such as a liquid crystal display.

The inventors have conducted serious studies in order to solve the above tasks with findings that the objects can be achieved with an adhesive for polarizing plate shown below, having led to completion of the invention.

That is, the invention is related to an adhesive for polarizing plate used in order to provide a transparent protective film on at least one surface of a polarizer, comprising a crosslinking agent in the range of more than 30 parts by weight and 46 parts by weight or less relative to 100 parts by weight of a polyvinyl alcohol-based resin having an acetoacetyl group.

Disclosed in Patent Document 1 is an adhesive prepared by mixing a crosslinking agent in the range of from 0.1 to 30 parts by weight into 100 parts by weight of a polyvinyl alcohol-based resin having an acetoacetyl group. However, if a mixing content of the crosslinking agent is 30 parts by weight or less, it cannot be said that there is obtained an adhesive having a sufficient water resistance in a dewing environment. It has been found that the adhesive for polarizing plate of the invention comprises a crosslinking agent in the range of more than 30 parts by weight and 46 parts by weight or less relative to 100 parts by weight of a polyvinyl alcohol-based resin having an acetoacetyl group and thereby, a water resistance thereof is drastically improved. A sample obtained by adhere a transparent protective film onto a polarizer with an adhesive mixed with a crosslinking agent in the above range, as shown in the examples, is excellent in water resistance. That is, for example, in a case where the sample is immersed in warm water of 60° C. for 5 hr in a durability test in a humidified condition, no peeling that is visually recognizable was generated at an end portion of a polarizing plate even when 5 hr elapses in the immersion. On the other hand, when a sample using an adhesive comprising a crosslinking agent at a content less than 30 parts by weight was immersed in warm water of 60° C. for 1 hr, shrinkage of a polarizer or decolorization of iodine developed at an end portion of the polarizing plate so as to be visually recognizable.

A mixing content of a crosslinking agent is in the range of more than 30 parts by weight and 46 parts by weight or less relative to 100 parts by weight of a polyvinyl alcohol-based resin having an acetoacetyl group. The more a mixing content of a crosslinking agent is in the range, the better the agent works, wherein a mixing content thereof is preferably 31 parts by weight or more, more preferably 32 parts by weight or more and especially preferably 35 parts by weight or more. On the other hand, if a mixing content of a crosslinking agent is excessively more, a reaction of a crosslinking agent progresses in a short time to thereby tend to cause an adhesive to be gelated. As a result, a pot life as an adhesive is extremely shorter, which makes industrial use thereof difficult. A mixing content of a crosslinking agent is preferably 46 parts by weight or less, more preferably 45 parts by weight or less and most preferably 40 parts by weight or less from the view point described above.

As a crosslinking agent used in the adhesive for polarizing plate, preferable comprises glyoxal and/or a compound having a methylol group.

The adhesive for polarizing plate is preferably used in a case where a polarizer is a polyvinyl alcohol-based polarizer and a transparent protective film is a transparent protective cellulose-based film.

The invention is related to a polarizing plate in which a transparent protective film is provided on at least one surface of a polarizer with an adhesive layer, wherein the adhesive layer is formed with the above adhesive for polarizing plate.

A thickness of an adhesive layer in the polarizing plate is in the range of from about 1 to 1000 nm, wherein if the thickness is excessively larger, unpreferably, it is hard to attain a uniform in-plane thickness and a problem, which is generation of scale-like non-uniformity in thickness etc., arises in appearance with ease. Therefore, the thickness is preferably 300 nm or less, more preferably 120 nm or less and especially preferably 95 nm or less. In the invention, an effect of improving an adhesive strength and durability is exerted by increasing a content of a crosslinking agent in the adhesive, whereas if the thickness is excessively thinner, an adhesive strength is insufficient in practical as polarizing plate. Hence, a thickness of the adhesive layer is preferably 30 nm or more, more preferably 40 nm or more, and especially preferably 50 nm or more. No specific limitation is placed on a method for adjusting a thickness of the adhesive layer, and exemplified is a method for adjusting a solid matter concentration of an adhesive solution or an operating condition of a coater for the adhesive. In a case of an adhesive of the invention comprising a polyvinyl alcohol-based resin having an acetoacetyl group, there arises a tendency that a viscosity is lower than an adhesive comprising a polyvinyl alcohol-based resin that has been conventionally used; therefore, the adhesive to be obtained has a sufficient adhesive strength even if a thickness of the adhesive layer is thin. No specific limitation is placed on a measurement method for a thickness of an adhesive layer and preferable is used a sectional observation and measurement with SEM (Scanning Electron Microscopy).

The invention is related to a fabrication method for polarizing plate in which a transparent protective film is provided on at least one surface of a polarizer with an adhesive layer, comprising the steps of:

preparing the above adhesive for polarizing plate; coating the adhesive for polarizing plate on a surface of the polarizer on which the adhesive layer is formed and/or a surface of the transparent protective film on which the adhesive layer is formed; and adhering the transparent protective film and the polarizer.

It is preferable that in the fabrication method for polarizing plate, a time taken until the adhesive for polarizing plate is coated after the adhesive for polarizer is prepared is preferably 240 min or less. Hence, an adhesive for polarizing plate is preferably prepared by mixing a crosslinking agent in the range of more than 30 parts by weight and 46 parts by weight or less into 100 parts by weight of a polyvinyl alcohol-based resin having an acetoacetyl group within 240 min prior to conducting of a coating step.

There arises a tendency that an adhesive prepared by mixing a crosslinking agent into a polyvinyl alcohol-based resin having an acetoacetyl group is gelated if the adhesive is left as it is for a long time. Hence, preparation of the adhesive is preferably completed in the shortest possible time prior to the coating. A preparation of the adhesive is conducted preferably within 240 min, more preferably within 180 min, further more preferably within 90 min, still further more preferably within 45 min and especially preferably within 30 min, prior to coating the adhesive.

It is preferable that in the fabrication method for polarizing plate, the preparation step for the adhesive for polarizing plate, the coating step for the adhesive for polarizing plate and the adhesion step of adhering the transparent protective film and the polarizer are all conducted at a temperature in the state of 25 to 50° C.

In connection with the adhesive, preferably controlled are temperatures, respectively, in the steps from preparation of the adhesive by mixing a crosslingking agent into a polyvinyl alcohol-based resin having an acetoacetyl group to coating thereof, and the adhesion step. Such a control of a temperature of an adhesive can improve a water resistance. A control temperature of the adhesive is preferably in the range of from 25 to 50° C., more preferably in the range of from 30 to 45° C. and further more preferably in the range of from 30 to 40° C. If the temperature is lower than 25° C., a water resistance is poor and peeling easily occurs between protective film and polarizer in a humidified condition. If the temperature is higher than 50° C., an adhesive is easily gelated immediately after mixing a crosslinking agent, which renders the adhesive difficult in use.

The invention is related to an optical film comprising at least one above polarizing plate.

The invention is related to an image display comprising the above polarizing plate or the above optical film.

BEST MODE FOR CARRYING OUT THE INVENTION

An adhesive for polarizing plate of the invention comprises a crosslinking agent and a polyvinyl alcohol-based resin having an acetoacetyl group.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 3000, preferably from 500 to 3000 and an average degree of saponification is from about 85 to about 100 mol %, preferably from 90 to 100 mol % in consideration of adherence.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 2 to 7 mol %. If a degree of modification by an acetoacetyl group exceeds 40 mol %, reaction sites with a crosslinking agent is fewer to thereby reduce an effect of improvement on water resistance.

Any of crosslinking agents that have been used in a polyvinyl alcohol-based adhesive can be used as a crosslinking agent in the invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane) triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglycidyl ether, 1,6-hexanediol diglycidyl ether, trimethylolpropane triglycidyl ether, diglicidyl aniline and diglicidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. Preferable among the crosslinking agents are amino-formaldehyde resins and dialdehydes. As amino-formaldehyde resins, preferable is a compound having a methylol group and as dialdehydes, preferable is glyoxal. Preferable is a compound having a methylol group, especially preferable is a methylolmelamine.

A crosslinking agent in the range of more than 30 parts by weight and 46 parts by weight or less is, as described above, mixed into 100 parts by weight of a polyvinyl alcohol-based resin having an acetoacetyl group.

An adhesive for polarizing plate comprising a crosslinking agent and a polyvinyl alcohol-based resin having an acetoacetyl group is usually used as an aqueous solution. No specific limitation is imposed on a concentration thereof in the aqueous solution, and the concentration is usually from 0.1 to 15 wt % and preferably from 0.5 to 10 wt % in consideration of coatability and self stability etc.

Note that various additives described below can be further mixed into an adhesive: coupling agents such as a silane coupling agent and a titanium coupling agent; various kinds of tackifiers; an ultraviolet absorbent; an antioxidant; stabilizers such as a heat resistance stabilizer and a hydrolysis resistance stabilizer; and the like.

A polarizing plate of the invention is fabricated by adhere a transparent protective film to a polarizer with the adhesive. A transparent protective film or transparent protective films are provided on one surface or both surfaces of a polarizer with an adhesive agent layer formed with the adhesive for polarizing plate interposed therebetween.

Coating with the adhesive may be performed on any or both of the transparent protective film and the polarizer. Coating with the adhesive is preferably performed so that a thickness of a coat after drying is in the range of from 1 to 1000 nm. No specific limitation is imposed on a coating operation and there can be adopted any of methods including a roller coating method, a spray coating, a dipping method and others.

Preparation of the adhesive is, as described above, preferably completed within 4 hr prior to coating of the adhesive. A process from preparation of the adhesive to coating thereof within a time as short as 4 hr can be realized by incorporating a preparation step for the adhesive as part into a fabrication process for a polarizer including a series of steps, or alternatively, by disposing a proper preparation apparatus.

After the adhesive is coated, the transparent protective is adhered to the polarizer with a roll laminator or the like. After adhesion, a drying step is performed to thereby form an adhesive layer that is a dry coated layer. A drying temperature is from about 5 to about 150° C., preferably from 30 to 120° C. and for a time of 120 sec or longer, preferably for a time 300 sec or longer.

Temperatures are preferably controlled in the preparation step, the coating step and the adhesion step, respectively. Control of a temperature of an adhesive can improve a water resistance. A control temperature of an adhesive is preferably in the range of from 25 to 50° C., as described above.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film comprises dichromatic materials such as iodine is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Proper transparent materials may be used as a transparent polymer or a film material that forms the transparent protective file, and the material having outstanding transparency, mechanical strength, heat stability and outstanding moisture interception property, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent protective film is formed as a cured layer made of heat curing type or ultraviolet ray curing type resins, such as acryl based, urethane based, acryl urethane based, epoxy based, and silicone based, etc.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness values of the transparent protective film can be properly determined and generally on the order in the range of from about 1 to about 500 µm from the viewpoint of a strength, workability such as handlability, requirement for a thin film and the like. Especially, the thickness values are preferably is in the range of from 1 to 300 µm and more preferably in the range of from 5 to 200 µm.

Moreover, it is preferable that the transparent protection film may have as little coloring as possible. Accordingly, a protection film having a retardation value in a film thickness direction represented by $Rth=[(nx+ny)/2-nz] \times d$ of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a retardation value (Rth) of from −90 nm to +75 nm in a thickness direction. The retardation value (Rth) in a thickness direction is preferably from −80 nm to +60 nm, and especially preferably from −70 nm to +45 nm.

As transparent protective films, preferable are a cellulose-based polymer such as triacetyl cellulose from the standpoint of a polarization characteristic, a durability or the like. Especially preferable is a triacetyl cellulose film. Note that in a case where protective films are provided on both sides of a polarizer, the protective films made from the same polymer may be used on both sides thereof or alternatively, the protective films made from polymer materials different from each other may also be used on respective both sides thereof.

An easy adhesion treatment can be applied onto a surface of a transparent protective film which is adhered to a polarizer. Examples of easy adhesion treatments include: dry treatments such as a plasma treatment and a corona treatment; chemical treatment such as alkaline treatment (saponification treatment); and a coating treatment in which an easy adhesion layer is formed. Among them, preferable are a coating treatment and an alkaline treatment each forming an easy adhesion layer. In formation of an easy adhesion layer, there can be used each of various kinds of easy adhesion materials such as a polyol resin, a polycarboxylic resin and a polyester resin. Note that a thickness of an easy adhesion layer is preferably usually from about 0.01 to about 10 µm, more preferably from about 0.05 to about 5 µm and especially preferably from about 0.1 to about 1 µm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transreflective plate, a retardation plate (a half wavelength plate and a quarter wavelength plate included), and a viewing angle compensation film, may be used. Especially preferable polarizing plates are; a reflection type polarizing plate or a transreflective type polarizing plate in which a reflector or a transreflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transreflective type polarizing plate may be obtained by preparing the above-mentioned reflective layer as a transreflective type reflective layer, such as a half-mirror etc. that reflects and transmits light. A transreflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transreflective type polarizing plate. That is, the transreflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrinked under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transreflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of examples and others showing the composition and effect of the invention in a concrete manner below. Note that a part or parts and % stated in the examples means a part by weight or parts by weight, and wt % unless otherwise specified.

Example 1

(Polarizer)
A polyvinyl alcohol film having a thickness of 75 μm, an average polymerization degree of 2400 and a saponification degree of 99.9 mol % was immersed in warm water of 30° C. for 60 sec and swollen. Then, the swollen film was further immersed in an aqueous solution of iodine and potassium iodide (at a ratio of iodine to potassium iodide=0.5 to 8 in weight) at a concentration of 0.3% and thereby dyed while being stretched by 3.5 times. Thereafter, the film was further stretched in a boric acid ester aqueous solution at 65° C. to a total stretch ratio of 6. After the second stretching, the stretched film was dried in an oven at 40° C. for 3 min to obtain a polarizer.

(Transparent Protective Film)
A triacetyl cellulose film having a thickness of 80 μm was used.

Example 1

(Preparation of Adhesive)
Dissolved into pure water in a temperature condition of 30° C. are 100 parts of a polyvinyl alcohol-based resin having an acetoacetyl group (with an average polymerization degree of 1200, a saponification degree of 98.5 mol % and an acetoacetylation degree of 5 mol %) and 32 parts of methylolmelamine to prepare an aqueous solution adjusted to have 4% of the solid matter concentration.

(Fabrication of Polarizing Plate)
The adhesive was coated on one surface of the transparent protective film to form an adhesive layer having a thickness of 80 nm after drying. The coating of the adhesive was performed in a temperature condition of 30° C. when 30 min elapsed after preparation of the adhesive. Triacetyl cellulose films coated with the adhesive were adhered onto both surfaces of the polarizer at a temperature condition of 30° C. with a roll laminator and thereafter, the polarizer with triacetyl cellulose films are dried at 55° C. for 6 min to thereby fabricate a polarizing plate.

Example 2

(Preparation of Adhesive)

Dissolved into pure water in a temperature condition of 30° C. are 100 parts of a polyvinyl alcohol-based resin having an acetoacetyl group (with an average polymerization degree of 1200, a saponification degree of 98.5 mol % and an acetoacetylation degree of 5 mol %) and 36 parts of methylolmelamine to prepare an aqueous solution adjusted to have 4% of the solid matter concentration.

(Fabrication of Polarizing Plate)

The adhesive was coated on one surface of the transparent protective film to form an adhesive layer having a thickness of 90 nm after drying. The coating of the adhesive was performed in a temperature condition of 30° C. when 30 min elapsed after preparation of the adhesive. Triacetyl cellulose films coated with the adhesive were adhered onto both surfaces of the polarizer at a temperature condition of 30° C. with a roll laminator and thereafter, the polarizer with triacetyl cellulose films are dried at 55° C. for 6 min to thereby fabricate a polarizing plate.

Example 3

(Preparation of Adhesive)

Dissolved into pure water in a temperature condition of 40° C. are 100 parts of a polyvinyl alcohol-based resin having an acetoacetyl group (with an average polymerization degree of 1200, a saponification degree of 98.5 mol % and an acetoacetylation degree of 5 mol %) and 43 parts of methylolmelamine to prepare an aqueous solution adjusted to have 4% of the solid matter concentration.

(Fabrication of Polarizing Plate)

The adhesive was coated on one surface of the transparent protective film to form an adhesive layer having a thickness of 50 nm after drying. The coating of the adhesive was performed in a temperature condition of 40° C. when 30 min elapsed after preparation of the adhesive. Triacetyl cellulose films coated with the adhesive were adhered onto both surfaces of the polarizer at a temperature condition of 40° C. with a roll laminator and thereafter, the polarizer with triacetyl cellulose films are dried at 55° C. for 6 min to thereby fabricate a polarizing plate.

Example 4

(Preparation of Adhesive)

Dissolved into pure water in a temperature condition of 30° C. are 100 parts of a polyvinyl alcohol-based resin having an acetoacetyl group (with an average polymerization degree of 1200, a saponification degree of 98.5 mol % and an acetoacetylation degree of 5 mol %) and 38 parts of glyoxal to prepare an aqueous solution adjusted to have 4% of the solid matter concentration.

(Fabrication of Polarizing Plate)

The adhesive was coated on one surface of the transparent protective film to form an adhesive layer having a thickness of 90 nm after drying. The coating of the adhesive was performed in a temperature condition of 30° C. when 30 min elapsed after preparation of the adhesive. Triacetyl cellulose films coated with the adhesive were adhered onto both surfaces of the polarizer at a temperature condition of 30° C. with a roll laminator and thereafter, the polarizer with triacetyl cellulose films are dried at 55° C. for 6 min to thereby fabricate a polarizing plate.

Example 5

(Preparation of Adhesive)

Dissolved into pure water in a temperature condition of 30° C. are 100 parts of a polyvinyl alcohol-based resin having an acetoacetyl group (with an average polymerization degree of 1200, a saponification degree of 98.5 mol % and an acetoacetylation degree of 5 mol %) and 32 parts of methylolmelamine to prepare an aqueous solution adjusted to have 10% of the solid matter concentration.

(Fabrication of Polarizing Plate)

The adhesive was coated on one surface of the transparent protective film to form an adhesive layer having a thickness of 310 nm after drying. The coating of the adhesive was performed in a temperature condition of 30° C. when 30 min elapsed after preparation of the adhesive. Triacetyl cellulose films coated with the adhesive were adhered onto both surfaces of the polarizer at a temperature condition of 30° C. with a roll laminator and thereafter, the polarizer with triacetyl cellulose films are dried at 55° C. for 6 min to thereby fabricate a polarizing plate.

Comparative Example 1

(Preparation of Adhesive)

Dissolved into pure water in a temperature condition of 23° C. are 100 parts of a polyvinyl alcohol-based resin having an acetoacetyl group (with an average polymerization degree of 1200, a saponification degree of 98.5 mol % and an acetoacetylation degree of 5 mol %) and 23 parts of methylolmelamine to prepare an aqueous solution adjusted to have 4% of the solid matter concentration.

(Fabrication of Polarizing Plate)

The adhesive was coated on one surface of the transparent protective film to form an adhesive layer having a thickness of 100 nm after drying. The coating of the adhesive was performed in a temperature condition of 23° C. when 30 min elapsed after preparation of the adhesive. Triacetyl cellulose films coated with the adhesive were adhered onto both surfaces of the polarizer at a temperature condition of 23° C. with a roll laminator and thereafter, the polarizer with triacetyl cellulose films are dried at 55° C. for 6 min to thereby fabricate a polarizing plate.

Comparative Example 2

(Preparation of Adhesive)

Dissolved into pure water in a temperature condition of 23° C. are 100 parts of a polyvinyl alcohol-based resin having an acetoacetyl group (with an average polymerization degree of 1200, a saponification degree of 98.5 mol % and an acetoacetylation degree of 5 mol %) and 48 parts of methylolmelamine to prepare an aqueous solution adjusted to have 4% of the solid matter concentration.

(Fabrication of Polarizing Plate)

The adhesive was coated on one surface of the transparent protective film to form an adhesive layer having a thickness of 80 nm after drying. The coating of the adhesive was performed in a temperature condition of 23° C. when 30 min elapsed after preparation of the adhesive, but not fabricate a polarizing plate because of a gelation of the adhesive during coating.

Comparative Example 3

(Preparation of Adhesive)

Dissolved into pure water in a temperature condition of 23° C. are 100 parts of a polyvinyl alcohol-based resin having an acetoacetyl group (with an average polymerization degree of 1700, a saponification degree of 88.5 mol % and an acetoacetylation degree of 6 mol %) and 10 parts of hexamethylene diamine to prepare an aqueous solution adjusted to have 4% of the solid matter concentration.

(Fabrication of Polarizing Plate)

The adhesive was coated on one surface of the transparent protective film to form an adhesive layer having a thickness of 120 nm after drying. The coating of the adhesive was performed in a temperature condition of 23° C. when 30 min elapsed after preparation of the adhesive. Triacetyl cellulose films coated with the adhesive were adhered onto both surfaces of the polarizer at a temperature condition of 23° C. with a roll laminator and thereafter, the polarizer with triacetyl cellulose films are dried at 50° C. for 5 min to thereby fabricate a polarizing plate.

Comparative Example 4

(Preparation of Adhesive)

Dissolved into pure water in a temperature condition of 23° C. are 100 parts of a polyvinyl alcohol-based resin having an acetoacetyl group (with an average polymerization degree of 1200, a saponification degree of 98.5 mol % and an acetoacetylation degree of 5 mol %) and 15 parts of glyoxal to prepare an aqueous solution adjusted to have 4% of the solid matter concentration.

(Fabrication of Polarizing Plate)

The adhesive was coated on one surface of the transparent protective film to form an adhesive layer having a thickness of 100 nm after drying. The coating of the adhesive was performed in a temperature condition of 23° C. when 30 min elapsed after preparation of the adhesive. Triacetyl cellulose films coated with the adhesive were adhered onto both surfaces of the polarizer at a temperature condition of 23° C. with a roll laminator and thereafter, the polarizer with triacetyl cellulose films are dried at 50° C. for 5 min to thereby fabricate a polarizing plate.

(Evaluation)

The following kinds of evaluation were performed on the polarizing plates obtained in Examples 1 to 5 and in Comparative Examples 1, 3 and 4.

(Peeling Length)

A sample was prepared by cutting a polarizing plate to obtain a piece having dimensions of 50 mm in the absorption axis direction of the polarizer and 25 mm in a direction perpendicular to the absorption axis thereof. The sample was immersed in warm water of 60° C. and a peeling length (mm) at an end portion of the sample was measured with the passage of time. Measurement of a peeling length (mm) was performed with a vernier caliper. Peeling lengths with time are shown in Table 1. Peeling lengths (mm) at the passage of 5 hr are shown in Table 2.

TABLE 1

| | Test times (min) | | | | | | | | | | | | |
|---|---|---|---|---|---|---|---|---|---|---|---|---|---|
| | 0 | 50 | 100 | 150 | 200 | 250 | 300 | 350 | 400 | 450 | 500 | 550 | 600 |
| | | | | | | Peeling lengths (mm) | | | | | | | |
| Example 1 | 0 | 0 | 0 | 0 | 0 | 0 | 0 | 0 | 0.25 | 0.25 | 0.25 | 0.25 | 0.25 |
| Example 2 | 0 | 0 | 0 | 0 | 0 | 0 | 0 | 0 | 0 | 0 | 0 | 0 | 0 |
| Example 3 | 0 | 0 | 0 | 0 | 0 | 0 | 0 | 0 | 0 | 0 | 0 | 0 | 0 |
| Example 4 | 0 | 0 | 0 | 0 | 0 | 0.25 | 0.25 | 0.25 | 0.25 | 0.25 | 0.25 | 0.25 | 0.25 |
| Example 5 | 0 | 0 | 0 | 0 | 0 | 0 | 0 | 0 | 0 | 0 | 0 | 0 | 0 |
| Comparative Example 1 | 0 | 0.5 | 0.5 | 0.5 | 0.5 | 0.5 | 0.5 | 0.5 | 0.5 | 0.5 | 0.5 | 0.5 | 0.5 |
| Comparative Example 3 | 0 | 0.3 | 0.3 | 0.5 | 0.5 | 0.75 | 0.75 | 0.75 | 0.75 | 0.75 | 0.75 | 0.75 | 0.75 |
| Comparative Example 4 | 0 | 0.5 | 0.75 | 5 | 25 | 25 | 25 | 25 | 25 | 25 | 25 | 25 | 25 |

(Decolorization of Iodine)

Decolorization of iodine in a polarizer was confirmed with the following decolorization evaluation method. That is, a sample was cut off from a fabricated polarizing plate in the central portion in the width direction to obtain a piece in a way such that a size thereof is 50 mm×25 mm and a long side thereof forms an angle of 45 degrees relative to the absorption axis of the polarizing plate, and a single transmittance (%) was measured with an integrating sphere transmittance measuring instrument (a trade name of DOT-3C, manufactured by MURAKAMI COLOR RESERCH LABORATORY). Another sample was, in a similar manner, cut off from the polarizing plate after immersion in water for 3 hr and a single transmittance (%) was measured on the sample to thereby obtain a difference therebetween (|ΔT % |).

(Appearance Evaluation)

A sample was prepared by cutting off from a polarizing plate to obtain a piece in a way such that a size thereof is 100 mm×100 mm. The sample is illuminated with light from a fluorescent lamp and appearance evaluation was visually performed with respect to the presence or absence of in-plane non-uniformity with reflection of light from the fluorescent lamp using the following criteria of "with non-uniformity" indicated by symbol ◯ and "without non-uniformity" indicated by symbol ×, respectively.

TABLE 2

| | Crosslinking agents | | | Thickness of adhesive layers (nm) | Times elapsing till coating with adhesive after preparation thereof (min) | Peeling lengths when 5 hr elapses (mm) | Decolorization of iodine: changes in single transmittance | Appearance evaluation |
|---|---|---|---|---|---|---|---|---|
| | Kinds | Mixing content (parts) | Control temperature (° C.) | | | | | |
| Example 1 | Methylol melamine | 32 | 30 | 80 | 30 | 0 | 0.425 | ○ |
| Example 2 | Methylol melamine | 36 | 30 | 90 | 30 | 0 | 0.371 | ○ |
| Example 3 | Methylol melamine | 43 | 40 | 50 | 30 | 0 | 0.217 | ○ |
| Example 4 | Glyoxal | 38 | 30 | 90 | 30 | 0.25 | 0.633 | ○ |
| Example 5 | Methylol melamine | 32 | 30 | 310 | 30 | 0 | 0.302 | x |
| Comparative Example 1 | Methylol melamine | 23 | 23 | 100 | 30 | 0.5 | 0.842 | ○ |
| Comparative Example 2 | Methylol melamine | 48 | 23 | 80 | 30 | — | — | — |
| Comparative Example 3 | Hexamethylene diamine | 10 | 23 | 120 | 30 | 0.7 | 1.380 | ○ |
| Comparative Example 4 | Glyoxal | 15 | 23 | 100 | 30 | 25 | 0.993 | ○ |

It is found from Table 2 that the polarizers of the examples experienced absolutely no peeling even in the condition of being immersed in warm water, changes in single transmittance values of 0.7 or less with extremely low decolorization of iodine and excellency in moisture resistance. No problem occurs in appearance evaluation in Examples 1 to 4.

INDUSTRIAL APPLICABILITY

A polarizing plate using an adhesive for polarizing plate of the invention alone or an optical film obtained by laminating the polarizing plates can be preferably used in an image display such as a liquid crystal display, an organic EL display or PDP.

The invention claimed is:

1. A polarizing plate in which a transparent protective film is provided on at least one surface of a polarizer with an adhesive layer, wherein the adhesive layer is formed with an adhesive for polarizing plate comprising a crosslinking agent in a range of more than 30 parts by weight and 46 parts by weight or less relative to 100 parts by weight of a polyvinyl alcohol-based resin having an acetoacetyl group having
   a degree of modification by the acetoacetyl group of from 2 to 7 mol %,
   a saponification degree of from about 85 to 100 mol %, and
   an average degree of polymerization of from about 100 to 3,000;
   wherein a thickness of the adhesive layer is from 1 to 95 nm, and
   wherein the crosslinking agent comprises a compound having a methylol group.

2. The polarizing plate according to claim 1, wherein the polarizer is a polyvinyl alcohol-based polarizer and the transparent protective film is a cellulose-based transparent protective film.

3. An optical film comprising at least one polarizing plate according to claim 1.

4. An image display comprising the optical film according to claim 3.

5. An image display comprising a polarizing plate according to claim 1.

6. The polarizing plate according to claim 1, wherein the transparent protective film has a retardation value in a film thickness direction represented by $Rth=[(nx+ny)/2-nz] \times d$ of from −90 nm to +75 nm, (where, nx and ny represent principal indices of refraction in a film plane, nz represents refractive index in a film thickness direction, and d represents a film thickness).

7. A fabrication method for a polarizing plate in which a transparent protective film is provided on at least one surface of a polarizer with an adhesive layer, comprising the steps of:
   preparing adhesive for polarizing plate comprising a crosslinking agent in a range of more than 30 parts by weight and 46 parts by weight or less relative to 100 parts by weight of a polyvinyl alcohol-based resin having an acetoacetyl group with a degree of modification by the acetoacetyl group of from 2 to 7 mol %, a saponification degree of from about 85 to 100 mol %, and an average degree of polymerization of from about 100 to about 3,000,
   coating the adhesive on a surface of the polarizer and/or a surface of the transparent protective film; and
   adhering the transparent protective film and the polarizer;
   wherein a thickness of the adhesive layer is from 1 to 95 nm.

8. The fabrication method for polarizing plate according to claim 7, wherein a time taken until the adhesive for polarizing plate is coated after the adhesive for polarizer is prepared is 240 min or less.

9. The fabrication method for polarizing plate according to claim 7, wherein the preparation step for the adhesive for polarizing plate, the coating step for the adhesive for polarizing plate and the adhesion step of adhering the transparent protective film and the polarizer are all conducted at a temperature in the state of from 25 to 50° C.

10. A polarizing plate in which a transparent protective film is provided on at least one surface of a polarizer with an adhesive layer, wherein the adhesive layer is formed with an adhesive for polarizing plate comprising a crosslinking agent in a range of more than 30 parts by weight and 46 parts by weight or less relative to 100 parts by weight of a polyvinyl alcohol-based resin having an acetoacetyl group having a degree of modification by the acetoacetyl group of about 5 mol %, a saponification degree of from about 95%, and an average degree of polymerization of about 1200;

wherein a thickness of the adhesive layer is from 1 to 95 nm, and wherein the crosslinking agent comprises a compound having a methylol group.

11. The polarizing plate according to claim 10, wherein the polarizer is a polyvinyl alcohol-based polarizer and the transparent protective film is a cellulose-based transparent protective film.

12. An optical film comprising at least one polarizing plate according to claim 10.

13. An image display comprising the optical film according to claim 12.

14. An image display comprising a polarizing plate according to claim 10.

15. The polarizing plate according to claim 10, wherein the transparent protective film has a retardation value in a film thickness direction represented by Rth=[(nx+ny)]/2−nz]×d of from −90 nm to +75 nm, (where, nx and ny represent principal indices of refraction in a film plane, nz represents refractive index in a film thickness direction, and d represents a film thickness).

16. A method of fabricating the polarizing plate of claim 10 in which a transparent protective film is provided on at least one surface of a polarizer with an adhesive layer, comprising the steps of:

preparing an adhesive comprising a crosslinking agent in a range of more than 30 parts by weight and 46 parts by weight or less relative to 100 parts by weight of a polyvinyl alcohol-based resin having an acetoacetyl group having a degree of modification by the acetoacetyl group of about 5 mol %, a saponification degree of from about 95%, and an average degree of polymerization of from about 1200;

coating the adhesive in a layer having a thickness from 1 to 95 nm on a surface of the polarizer and/or a surface of the transparent protective film; and adhering the transparent protective film and the polarizer.

17. The fabrication method for polarizing plate according to claim 16, wherein a time taken until the adhesive for polarizing plate is coated after the adhesive for polarizer is prepared is 240 min or less.

18. The fabrication method for polarizing plate according to claim 16, wherein the preparation step for the adhesive for polarizing plate, the coating step for the adhesive for polarizing plate and the adhesion step of adhering the transparent protective film and the polarizer are all conducted at a temperature in the state of from 25 to 50° C.

* * * * *